United States Patent
Matsumoto et al.

(10) Patent No.: US 8,997,302 B2
(45) Date of Patent: Apr. 7, 2015

(54) WIPER DEVICE

(75) Inventors: Yasuhiro Matsumoto, Hamamatsu (JP); Susumu Kuniyasu, Toyota (JP)

(73) Assignees: ASMO Co., Ltd., Shizuoka-pref. (JP); Toyota Jidosha Kabushiki Kaisha, Toyota-shi (JP)

( * ) Notice: Subject to any disclaimer, the term of this patent is extended or adjusted under 35 U.S.C. 154(b) by 498 days.

(21) Appl. No.: 13/497,071

(22) PCT Filed: Apr. 15, 2011

(86) PCT No.: PCT/JP2011/059887
§ 371 (c)(1),
(2), (4) Date: Mar. 20, 2012

(87) PCT Pub. No.: WO2011/132762
PCT Pub. Date: Oct. 27, 2011

(65) Prior Publication Data
US 2012/0180243 A1 Jul. 19, 2012

(30) Foreign Application Priority Data
Apr. 20, 2010 (JP) ................................ 2010-097265

(51) Int. Cl.
*B60S 1/52* (2006.01)
*B60S 1/34* (2006.01)

(52) U.S. Cl.
CPC ............... *B60S 1/3406* (2013.01); *B60S 1/522* (2013.01)

(58) Field of Classification Search
USPC ............... 15/250.21, 250.23, 250.04, 250.01, 15/250.02, 250.351; 239/284.1, 284.2
See application file for complete search history.

(56) References Cited

U.S. PATENT DOCUMENTS

| 3,657,618 | A | * | 4/1972 | Ori et al. ........................ 318/102 |
| 3,793,670 | A | | 2/1974 | Riester et al. |
| 4,439,887 | A | * | 4/1984 | Fischer et al. .............. 15/250.04 |
| 5,987,695 | A | * | 11/1999 | Edele et al. ................ 15/250.04 |
| 6,442,788 | B1 | | 9/2002 | Fleischer |

(Continued)

FOREIGN PATENT DOCUMENTS

| CN | 2470200 Y | 1/2002 |
| CN | 1386097 A | 12/2002 |

(Continued)

OTHER PUBLICATIONS

International Search Report and Written Opinion of the International Searching Authority mailed Aug. 2, 2011 in the corresponding PCT application No. PCT/JP2011/059887.

(Continued)

*Primary Examiner* — Gary Graham
(74) *Attorney, Agent, or Firm* — Posz Law Group, PLC

(57) ABSTRACT

A wiper device including a wiper arm, a wiper blade, and a washer nozzle. The wiper blade moves in a first direction and a second direction. The wiper arm is arranged at a position in the second direction with respect to the wiper blade when the wiper blade is at the home position. The washer nozzle is fixed to a position located toward a basal side from the wiper blade on a main arm or a sub-arm that is closer to the wiper blade. The washer fluid is ejected toward the distal portion of the wiper blade at a position in the first direction with respect to the wiper blade when the wiper blade is arranged at the home position. The falling point of the washer fluid is set at a position located toward the basal side of the wiper blade from a central part of the wiper blade.

6 Claims, 5 Drawing Sheets

(56) References Cited

U.S. PATENT DOCUMENTS

| | | | |
|---|---|---|---|
| 7,506,400 B2 * | 3/2009 | Zimmer | 15/250.04 |
| 2003/0028990 A1 | 2/2003 | Zimmer | |
| 2006/0282971 A1 | 12/2006 | Makihara et al. | |

FOREIGN PATENT DOCUMENTS

| | | | |
|---|---|---|---|
| DE | 19904964 A | | 8/2000 |
| EP | 1733940 A2 | | 12/2006 |
| GB | 1201291 | * | 8/1970 |
| GB | 1397096 A | | 6/1975 |
| JP | 48-27428 A | | 4/1973 |
| JP | 54-78146 U | | 6/1979 |
| JP | 2002-536244 A | | 10/2002 |
| JP | 2004-203180 A | | 7/2004 |
| JP | 2006-298278 A | | 11/2006 |
| JP | 2006-347302 A | | 12/2006 |
| JP | 2007-062547 A | | 3/2007 |
| JP | 2007-196724 A | | 8/2007 |
| JP | 2008-055979 A | | 3/2008 |
| JP | 2008-168808 A | | 7/2008 |
| JP | 2009-166777 A | | 7/2009 |
| JP | 2009-190556 A | | 8/2009 |

OTHER PUBLICATIONS

Office action dated Mar. 14, 2014 in the corresponding CN application No. 201180004363.7 (and English translation).
Office Action dated Apr. 16, 2013 in the corresponding JP patent application No. 2010-097265.

* cited by examiner

Fig.4A Fig.4B Fig.4C
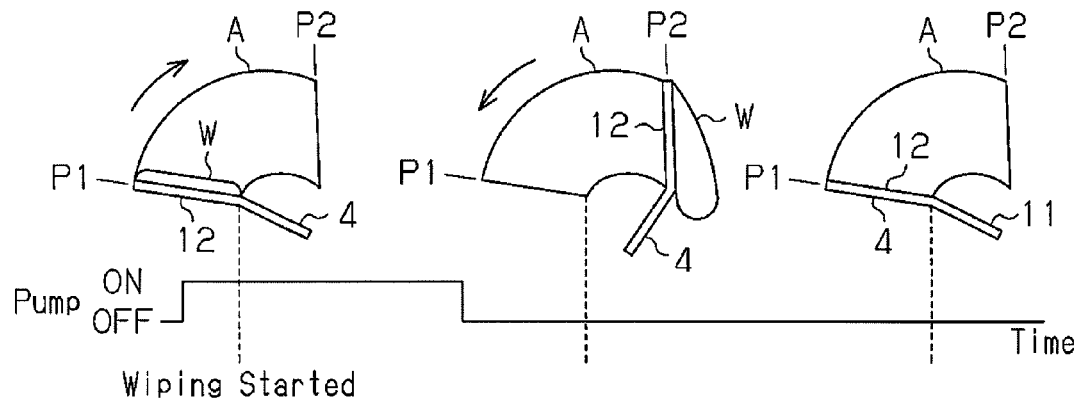
Fig.5
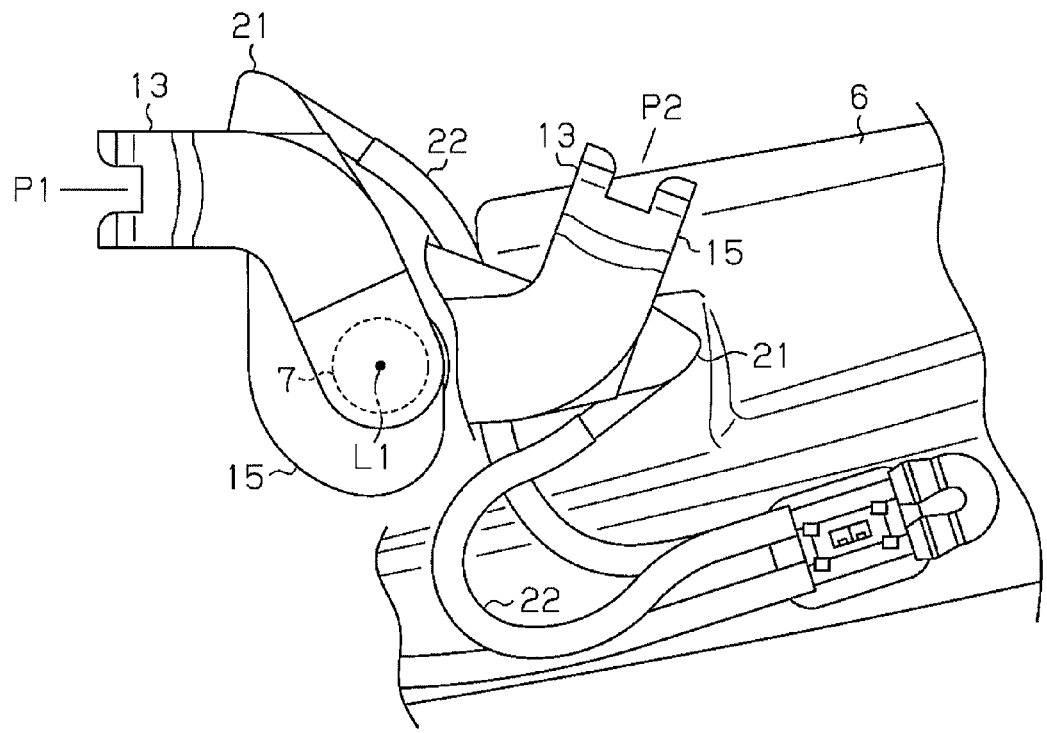

WIPER DEVICE

CROSS REFERENCE TO RELATED APPLICATIONS

This application is a U.S. national stage application of PCT/JP2011/059887 filed on Apr. 15, 2011, and claims priority to, and incorporates by reference, Japanese patent application no. 2010-097265 filed on Apr. 20, 2010.

TECHNICAL FIELD

The present invention relates to a wiper device that ejects washer fluid and wipes a wiping surface.

BACKGROUND

Japanese Laid-Open Patent Publication No. 2009-190556, Japanese Laid-Open Patent Publication No. 2009-166777, and Japanese Laid-Open Patent Publication No. 2008-55979 propose prior art examples of a wiper device including a pantograph type wiper arm. Such a wiper arm includes a main arm and a sub-arm. The main arm includes a basal portion, which is coupled to and pivoted integrally with a drive shaft. The drive shaft is rotated back and forth by drive force of a wiper motor. The sub-arm includes a basal portion pivotally coupled to a driven shaft, which is located at a different position from the drive shaft. A wiper blade is pivotally coupled to distal portions of the main arm and the sub-arm by a coupling member. When the main arm is pivoted about the drive shaft, the sub-arm is pivoted about the driven shaft following. Further, in cooperation with the pivoting of the main arm, the wiper blade changes its wiping position with respect to the wiper arm of the wiper blade. Thus, the wiper blade coupled to the pantograph type wiper arm wipes a wiping surface over a wider range than a wiper blade that is coupled to a single wiper arm, which is pivoted about a drive shaft.

Further, Japanese Laid-Open Patent Publication No. 2007-62547 describes an example of a wiper device that includes a washer nozzle for ejecting washer fluid onto a wiping surface. In the wiper device described in Japanese Laid-Open Patent Publication No. 2007-62547, the washer nozzle is arranged in a coupling member coupled to distal portions of a main arm and a sub-arm. A hose is connected to the washer nozzle so as to supply washer fluid.

Japanese Laid-Open Patent Publication No. 48-27428 describes a wiper device including a main arm, which has a main arm member. A main head rotates integrally with a drive shaft. The main arm member is pivotally coupled to the main head so as to move toward and away from a wiping surface. The washer nozzle is fixed to the main arm member.

However, in the wiper device described in Japanese Laid-Open Patent Publication No. 2007-62547, the hose is arranged along the wiper arm from a distal end to a basal end of the wiper arm, and the hose is fixed to the wiper arm. Thus, the hose is long. This makes it difficult to couple the hose and increases the cost of the wiper device.

Further, when the wiper arm, which is arranged at a stop position, starts to move, it is desirable that the washer fluid be ejected toward the front of the wiper blade in the moving direction of the wiper blade as wiping starts. However, in the wiper devices described in Japanese Laid-Open Patent Publication No. 2007-62547 and Japanese Laid-Open Patent Publication No. 48-27428, the wiper arm is arranged at the rear of the wiper blade in the moving direction when wiping is started. Thus, in the wiper devices described in Japanese Laid-Open Patent Publication No. 2007-62547 and Japanese Laid-Open Patent Publication No. 48-27428, to eject the washer fluid towards the front of the wiper blade in the moving direction when the wiper blade starts wiping, the washer nozzle must be arranged to extend across the upper side of the wiper blade from the wiper arm and project toward the front of the wiper blade in the moving direction when wiping is started. This increases the amount the washer nozzle projected from the wiper arm. Thus, when a vehicle provided with such a wiper device travels, the washer nozzle may receive wind resistance or produce wind noise. In addition, the outer appearance of the wiper device would be adversely affected. Further, to avoid dry wiping of the wiping surface and thereby improve the wiping performance, the washer fluid must be ejected right near the wiper blade and at the front of the wiper blade in the moving direction when wiping is started. However, if washer fluid is ejected from a washer nozzle that projects toward the front of the wiper blade in the moving direction when wiping is started, the washer fluid would be ejected substantially orthogonal to the wiping surface over a very short distance. Thus, the washer fluid may not spread over the wiping surface. To solve this problem, the washer fluid may be ejected from multiple points using a special elongated washer nozzle including multiple ejection ports, which are arranged along the longitudinal direction of the wiper blade. However, such a washer nozzle that includes many ejection ports is complicated and expensive. This increases the cost of the wiper device.

SUMMARY

It is an object of the present invention to provide a wiper device that improves the wiping performance at a low cost.

To achieve the above object, one aspect of the present invention provides a wiper device including a wiper arm, a wiper blade, and a washer nozzle. The wiper arm includes a main arm and a sub-arm. The main arm includes a basal portion coupled to and pivoted integrally with a drive shaft. The sub-arm includes a basal portion pivotally coupled to a driven shaft, which is separated from the drive shaft and rotated following the pivoting of the main arm. The wiper blade is pivotally coupled to a distal portion of the wiper arm. The wiper blade wipes a wiping surface while changing a wiping position relative to the wiper arm in cooperation with pivoting of the main arm. The wiper blade moves in a first direction from a home position to an upper reversal position and a second direction from the upper reversal position to the home position. The washer nozzle is fixed to the wiper arm and ejects washer fluid toward the wiping surface. The wiper arm is arranged at a position in the second direction with respect to the wiper blade when the wiper blade is arranged at the home position. The washer nozzle is fixed to the one of the main arm and sub-arm that is closer to the wiper blade. The washer nozzle is located at a position nearer a basal side from the wiper blade. An ejection direction of the washer fluid is set toward a distal end of the wiper blade at a position in the first direction with respect to the wiper blade when the wiper blade is arranged at the home position. A falling point of the washer fluid is set at a position located toward a basal side of the wiper blade from a longitudinally central part of the wiper blade.

In this structure, the wiper arm includes two arms, namely, the main arm and the sub-arm. The wiper arm is arranged at a position in the second direction with respect to the wiper blade in a state in which the wiper blade is arranged at the home position to prevent the driver's field of view from being obstructed by the wiper arm. In such a wiper device, the washer nozzle is fixed to the one of the main arm and sub-arm that is closer to the wiper blade and located at a position nearer the basal side of the arm from the wiper blade. Further, the ejection direction of the washer fluid from the washer nozzle is set extending toward the distal end of the wiper blade at a position in the first direction with respect to the wiper blade when the wiper blade is arranged at the home position. Thus, the washer fluid ejected from the washer nozzle strikes the wiping surface at an acute angle when falling on the wiping surface. The washer fluid that falls on the wiping surface spreads out in an elongated manner along the longitudinal direction of the wiper blade at the position in the first direction with respect to the wiper blade when the wiper blade is arranged at the home position. Further, the falling point of the washer fluid is set to a position located toward the basal side from the longitudinally central part of the wiper blade. Thus, by adjusting the ejection amount and ejection pressure of the washer fluid, the washer fluid can be spread out further widely in the longitudinal direction of the wiper blade. When the wiper blade performs wiping in this state, the wiper blade spreads out the washer in the moving direction of the wiper blade. The wiper blade also cleans the wiping surface with the washer fluid. This improves the wiping performance of the wiper device according to the present invention.

Further, the washer nozzle is fixed at a position nearer the basal side of the wiper blade on the one of the main arm and sub-arm that is closer to the wiper blade. This significantly shortens the hose that supplies the washer fluid to the washer nozzle. Accordingly, costs are reduced, and the layout (coupling) of the hose is facilitated.

Moreover, the washer nozzle is fixed to the one of the main arm and sub-arm that is closer to the wiper blade and located at a position of the arm that is not parallel to the wiper blade in the wiping direction. Accordingly, even though the washer nozzle is not greatly projected and does not transverse the upper side of the wiper blade, the ejected washer fluid falls at a position in the first direction with respect to the wiper blade when the wiper blade is arranged at the home position.

Preferably, the main arm is arranged closer to the wiper blade than the sub-arm and includes a main head, which is coupled to and rotated integrally with the drive shaft, and a main arm member, which is coupled to the main head to be pivotal toward and away from the wiping surface. The washer nozzle is fixed to the main head.

In this structure, the washer nozzle is fixed to the main head, which is coupled to the drive shaft. Thus, the washer fluid is ejected towards the wiping surface even when the main arm member is pivoted to move away from the wiping surface so that the wiper blade is separated from the wiping surface and takes an upright position. Further, the washer fluid is prevented from being erroneously ejected into air.

Preferably, the wiper blade changes the wiping position relative to the wiper arm when moving in the first direction. This switches the falling point from a position in the first direction to a position in the second direction with respect to the wiper blade. A longitudinal axis of the wiper blade intersects an ejection axis of the washer fluid when viewed from a normal direction of the wiping surface in a state in which the wiper blade is arranged near the upper reversal position.

In this structure, in the vicinity of the upper reversal position, the wiper blade is pivoted relative to the wiper arm, to which the washer nozzle is fixed, to change the wiping position so that the ejection axis intersects the longitudinal axis of the wiper blade when viewed from the normal direction of the wiping surface. Accordingly, the wiper blade, which changes wiping positions, is located at the front of the direction of the ejection axis direction of the washer fluid. This effectively prevents the washer fluid from being sprayed out.

Preferably, the wiper blade is coupled to the distal portion of the wiper arm so that a longitudinal axis of the wiper blade descends from the distal end toward basal end of the wiper blade when arranged at the home position.

In this structure, the longitudinal axis of the wiper blade at the stop position descends from the distal end toward the basal end. This prevents the ejected washer fluid from being separated from the wiper blade towards the distal side of the wiper blade. Further, the ejection axis of the ejected washer fluid is easily set substantially parallel to the longitudinal axis of the wiper blade at a position in the first direction with respect to the wiper blade when the wiper blade is arranged at the home position.

Preferably, the main arm includes a main head, which is coupled to and rotated integrally with the drive shaft, and a main arm member, which is coupled to the main head to be pivotal toward and away from the wiping surface. The main arm member includes a basal portion, which is coupled to the main head, and a bent portion, which bends a distal portion located opposite to the basal portion toward the wiper blade. The main arm is arranged closer to the wiper blade than the sub-arm. The basal portion of the wiper blade is arranged in a triangular region, of which vertices are the basal portion, distal portion, and bent portion of the main arm when the wiper blade is arranged at the home position.

In this structure, in a state in which the wiper blade is arranged at the home position, the wiper blade is arranged so that its longitudinal axis descends from the distal end toward the basal end without the need to arrange the basal portion of the wiper blade between the wiper arm and the wiping surface, that is, without the need for overlapping the basal portion of the wiper blade and the wiper arm in the normal direction of the wiping surface. This allows for the height of the main arm from the wiping surface to be kept low. Thus, when a vehicle includes the wiper device, in addition to keeping the wind resistance received by the main arm low, the main arm is prevented from obstructing the driver's field of view when the vehicle is traveling.

Preferably, the wiper device further includes a drive means and a control means. The drive means directly or indirectly drives the drive shaft. The control means controls the ejection of the washer fluid from the washer nozzle and the driving of the drive means based on an ejection instruction signal input by activating a washer switch. The control means immediately ejects the washer fluid from the washer nozzle when the ejection instruction signal is input. Further, the control means controls the drive means to drive the drive shaft after a predetermined waiting time elapses from when the ejection instruction signal is input.

In this structure, the longitudinal axis of the wiper blade arranged at the stop position descends from the distal end toward the basal end. Thus, during the period from when the washer fluid is ejected to when the waiting time elapses, some of the washer fluid moves along the wiper blade toward the basal side of the wiper blade. Accordingly, the washer fluid reaches a region in the basal side of the wiper blade from the falling point.

Preferably, the main head includes a first side surface, facing toward the sub-arm, and a second side surface, opposite from the first side surface. The washer nozzle is fixed to the second side surface.

In this structure, the washer nozzle is fixed to the side surface of the main head and does not project upward from the main arm. Thus, interference between the washer nozzle and the sub-arm is prevented while keeping the height low from the wiping surface of the wiper arm (main arm). This increases the degree of layout freedom for the side surface on the main head of the washer nozzle.

BRIEF DESCRIPTION OF THE DRAWINGS

FIG. 4 is a diagram illustrating the operation of the wiper shown in FIG. 1;

FIG. 5 is a front view illustrating the operation of the main head shown in FIGS. 3A and 3B;

DESCRIPTION OF EMBODIMENTS

One embodiment of the present invention will now be discussed with reference to the drawings.

Figure 1:
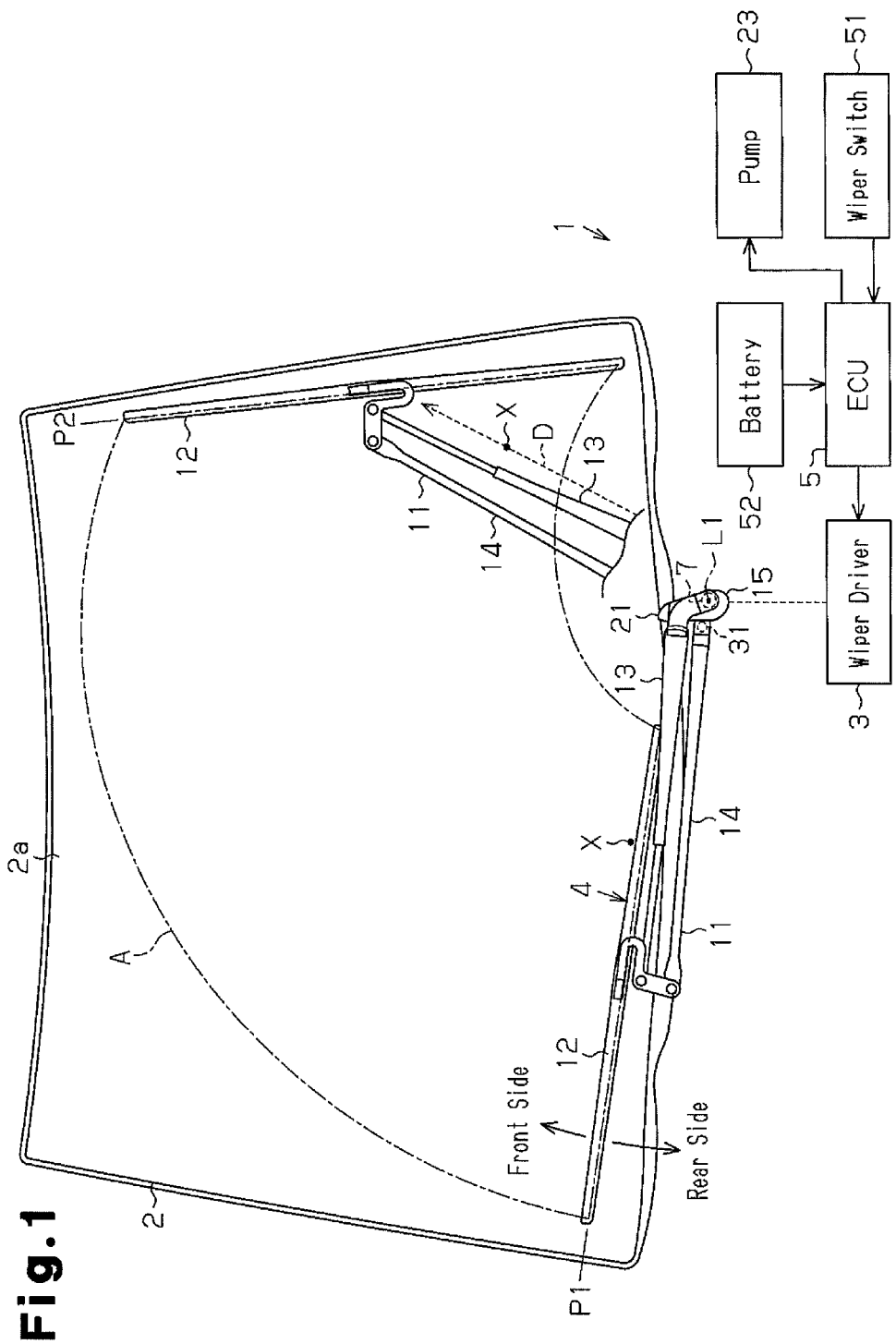
FIG. 1 is a schematic diagram of a wiper device according to one embodiment of the present invention.

As shown in FIG. 1, a wiper device 1 wipes a wiping surface 2a, which is a surface of a front glass 2 of a vehicle at an outer side of a passenger compartment. The wiper device 1 includes a wiper driver 3 serving as a drive means (drive unit), a wiper 4, and an electronic control unit (ECU) 5 serving as a control means (control unit).

The wiper driver 3 includes a wiper motor (not shown) having an output shaft coupled directly or indirectly to a pivot shaft 7 (drive shaft) by a link mechanism (not shown). The pivot shaft 7 is rotatably supported by a pivot holder (not shown) fixed to a vehicle body 6 (see FIG. 2). When the wiper motor is driven, a rotational drive force of the wiper motor is transmitted to the pivot shaft 7 and the pivot shaft 7 is pivoted back and forth about its axis L1.

Figure 2:
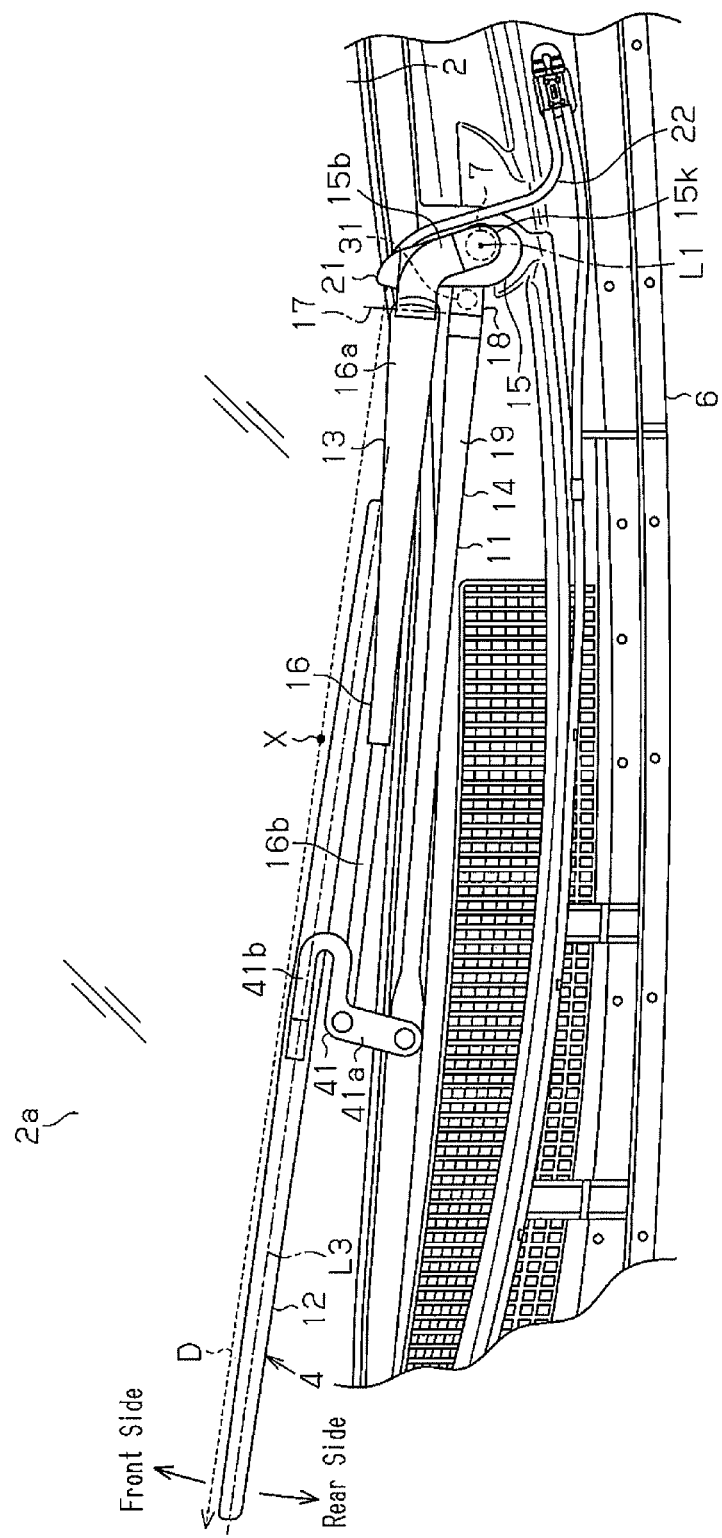
FIG. 2 is a front view of a wiper shown in FIG. 1.

As shown in FIG. 2, the wiper 4 includes a wiper arm 11 and a wiper blade 12, which is pivotally coupled to the wiper arm 11. The wiper arm 11 is a so-called pantograph type wiper arm and includes a substantially rod-shaped main arm 13 and a substantially rod-shaped sub-arm 14, which is arranged along the main arm 13.

The main arm 13 includes a main head 15, which is arranged at a basal side of the main arm 13, and a main arm member 16, which is coupled to a distal portion of the main head 15.

Figure 3A:
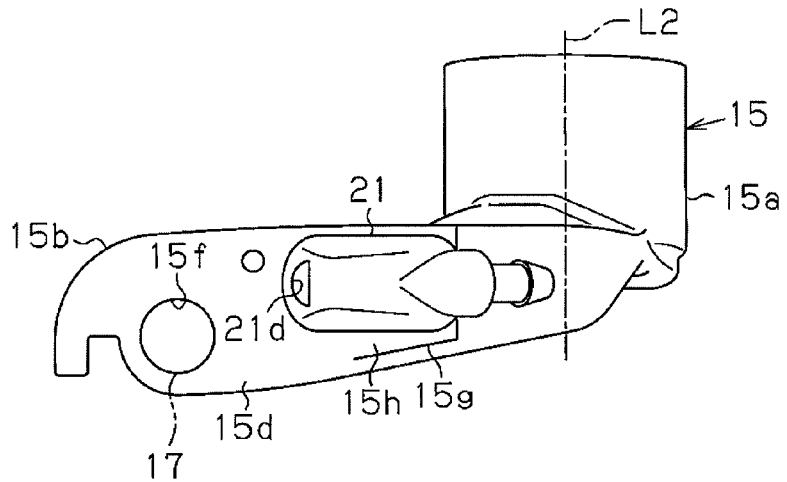
FIG. 3A is a side view of a main head shown in FIG. 2.
Figure 3B:
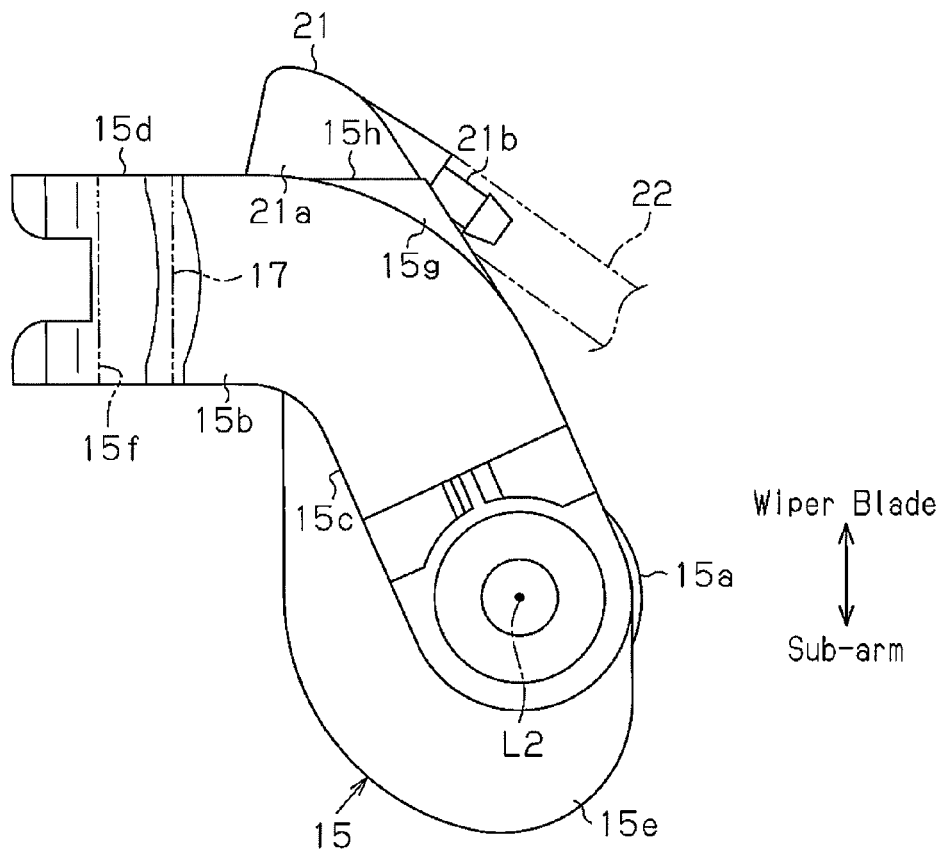
FIG. 3B is a plan view of the main head shown in FIG. 2.

As shown in FIGS. 3A and 3B, the main head 15, which is aluminum die-cast, includes a basal portion defining a cylindrical shaft coupling portion 15a. The shaft coupling portion 15a is fitted onto and fixed to a distal portion of the pivot shaft 7 (see FIG. 2) so that the main head 15 is coupled to and rotated integrally with the pivot shaft 7 (refer to FIG. 2). A head main body 15b extends from a distal portion of the shaft coupling portion 15a (lower end portion as viewed in FIG. 3A) towards the distal side of the main head 15 and curves into an "L" shape. A head cover 15k (see FIG. 2), which is made of resin, is attached to a basal portion of the head main body 15b at a location overlapped in an axial direction with the shaft coupling portion 15a. The head main body 15b includes side surfaces 15c and 15d located on opposite sides in a widthwise direction. The side surface 15c facing toward the sub-arm 14 includes an extension 15e, which extends toward the sub-arm 14 in a direction orthogonal to the axial direction of the shaft coupling portion 15a.

An insertion hole 15f is formed in a distal portion of the head main body 15b, or the distal portion of the main head 15. The insertion hole 15f extends through the side surfaces 15c and 15d at opposite sides of the head main body 15b along a direction that is skew to an axis L2 of the shaft coupling portion 15a. A seat 15g projects from the side surface 15d that faces toward the wiper blade 12. The seat 15g projects towards the wiper blade 12 from a curved part of the head main body 15b. The seat 15g includes a planar fastening surface 15h (second side surface), which extends along the same plane as the side surface 15d in a distal planar part of the head main body 15b. The fastening surface 15h is a side surface of the main head 15 opposite to the side surface 15c (first side surface) that faces toward the sub-arm 14. The fastening surface 15h extends parallel to the axis L2.

A washer nozzle 21, which is made of resin, is fixed to the fastening surface 15h. The washer nozzle 21 includes a nozzle body 21a, which has a trapezoidal shape when viewed from the direction of the axis L2, and a hose coupling portion 21b, which projects from the nozzle body 21a towards the basal side of the main head 15. The nozzle body 21a includes an ejection port 21d that opens toward the distal side of the main head 15. The ejection port 21d in the nozzle body 21a is in communication with the interior of the tubular hose coupling portion 21b. The hose coupling portion 21b includes a distal portion fitted to one end of a hose 22, which supplies washer fluid to the washer nozzle 21. The hose 22 has another end connected to a pump 23 (see FIG. 1), which is installed in the vehicle. When the pump 23 is activated, the washer fluid stored in a tank (not shown) is supplied to the washer nozzle 21 through the hose 22 and ejected from the ejection port 21d as a concentrated jet stream having directivity.

As shown in FIG. 2, the main arm member 16 includes a main arm retainer 16a, which is coupled to the distal portion of the main head 15, and a rod-shaped main arm piece 16b, which includes a basal portion held by the main arm retainer 16a. The main arm retainer 16a includes a basal portion, which has a channel-shaped cross-section that opens towards the wiping surface and is overlapped with the distal portion of the main head 15 to cover the insertion hole 15f (see FIG. 3A). A cylindrical coupling shaft 17 is inserted into the insertion hole 15f through the part at which the basal portion of the main arm retainer 16a and the distal portion of the main head 15 are overlapped. This couples the main arm retainer 16a to the main head 15 with the coupling shaft 17. The main arm retainer 16a is pivotal about the coupling shaft 17 relative to the main head 15. In FIG. 2, the coupling shaft 17 is shown as the axis of the coupling shaft 17.

The sub-arm 14 has a length in the longitudinal direction that is substantially equal to that of the main arm 13. The sub-arm 14 includes a sub-head 18, which is pivotally coupled to a driven shaft 31 located at a different position from the pivot shaft 7, and a rod-shaped sub-arm member 19. The sub-arm member 19 includes a basal portion pivotally coupled to the sub-head 18. The driven shaft 31 is supported by a sub-shaft holder (not shown) formed integrally with the pivot holder near the pivot shaft 7.

Distal portions of the main arm 13 and the sub-arm 14 are each pivotally coupled to a coupling member 41. The coupling member 41 includes an elongated plate-shaped arm coupling portion 41a and a blade coupling portion 41b, which is formed integrally with one longitudinal end of the arm coupling portion 41a. The distal portion of the main arm 13 and the distal portion of the sub-arm 14 are coupled to the arm coupling portion 41a in a state spaced apart from each other in the longitudinal direction of the arm coupling portion 41a. The main arm 13 and the sub-arm 14 are each pivotal to the arm coupling portion 41a.

The blade coupling portion 41b extends from one longitudinal end of the arm coupling portion 41a, which is the end located closer to the main arm 13, toward the basal side of the main arm 13 and is then folded back in a U-shaped manner to extend towards the distal portion of the main arm 13. The substantially rod-shaped wiper blade 12 includes a central part in the longitudinal direction that is pivotally coupled to the distal portion of the blade coupling portion 41b. In other words, the wiper blade 12 is pivotally coupled to the distal portions of the main arm 13 and the sub-arm 14 by the coupling member 41 so that the wiping position relative to the main arm 13 and the sub-arm 14 can be changed. That is, the wiper blade 12 and the coupling member 41 pivot integrally relative to the main arm 13 and the sub-arm 14. In the wiper 4 of the present embodiment, the main arm 13 is arranged closer than the sub-arm 14 to the wiper blade 12. The wiper arm 11 is arranged at the rear of the wiper blade 12 in the moving direction when the wiper blade 12 starts wiping. The wiper blade 12 is coupled to the distal portion of the wiper arm 11 so that a longitudinal axis L3 of the wiper blade 12 descends relative to a vertical direction from the distal end (left end in FIG. 2) toward the basal end (right end side in FIG. 2) of the wiper blade 12 when the wiper blade 12 is arranged at a stop position P1 (i.e., state shown in FIG. 2). In other words, the longitudinal axis L3 of the wiper blade 12 intersects the longitudinal axis of the main arm 13 at the basal side of the wiper blade 12 when viewed from a direction orthogonal to the wiping surface. The stop position P1 is where the wiper blade 12 is arranged when the wiper 4 is stopped and located at the lower end of the front glass 2.

As shown in FIG. 1, when the pivot shaft 7 pivots and the main arm 13 pivots about the pivot shaft 7, the sub-arm 14 moves accordingly. The wiper 4 pivots as the main arm 13 pivots and moves the sub-arm 14. Then, the wiper blade 12 swings as it changes its wiping position relative to the wiper arm 11 in cooperation with the pivoting of the main arm 13. This wipes a predetermined wiping range A (i.e., path of the wiper blade 12) in the wiping surface 2a with the wiper blade 12. The wiper blade 12 swings back and forth between the stop position P1 and an upper reversal position P2 at which the wiper blade 12 is arranged along one lateral end (at one of the front pillar of the vehicle) of the front glass 2.

As shown in FIG. 2, the wiper 4 is pivoted relative to the main head 15 so that the main arm member 16 moves away from the wiping surface 2a. Simultaneously, the wiper 4 is pivoted relative to the sub-head 18 so that the sub-arm member 19 moves away from the wiping surface 2a. This arranges the wiper blade 12 in an upright position (so-called lock back state) in which the wiper blade 12 is separated from the wiping surface 2a.

An ejection direction D and a falling point X of the washer fluid ejected from the ejection port 21d (see FIG. 3A) of the washer nozzle 21 will now be described. First, in a state in which the wiper blade 12 is arranged at the stop position P1, the ejection direction D of the washer fluid is set to a direction extending toward the longitudinal distal end (left end in FIG. 2) of the wiper blade 12 from a location in front of the wiper blade 12 relative to the moving direction when the wiper blade 12 starts wiping. Further, the ejection direction D is adjusted so that the ejection axis of the washer fluid ejected from the washer nozzle 21 (conforming to the arrow of the broken line indicating the ejection direction D in FIG. 2) is substantially parallel to the longitudinal axis L3 of the wiper blade 12.

In a state in which the wiper blade 12 is arranged at the stop position P1, the falling point X of the washer fluid is set at a position located toward the basal side (right side in FIG. 2) of the wiper blade 12 from the longitudinally central part of the wiper blade 12 on the wiping surface 2a. In the present embodiment, at the stop position P1, the falling point X is set on the wiping surface 2a at a location corresponding to a central section in a basal part (adjacent to the central part), which is located at the basal side of the longitudinally central part of the wiper blade 12 (coupling position of the blade coupling portion 41b in the present example), of the wiper blade 12.

The ejection amount and the ejection pressure of the washer fluid from the washer nozzle 21 are set to appropriate values that satisfy various requirements, such as the ejected washer fluid not being scattered over a wide range when falling on the front glass 2 and the washer fluid being efficiently consumed. Further, the ejection amount of the washer fluid is set to an amount that spreads the washer fluid over a range extending from the distal end to basal end of the wiper blade 12 during a period from when the washer fluid is ejected until the wiper 4 starts pivoting. The washer fluid ejected from the ejection port 21d of the washer nozzle 21 is ejected as a concentrated jet stream having directivity, and the direction of the jet stream is adjustable.

As shown in FIG. 1, the ECU 5 is electrically connected to a wiper switch (washer switch) 51, which is arranged in the passenger compartment and operated by the driver of the vehicle, and powered by a battery 52 of the vehicle. The ECU 5 includes a known timer circuit (not shown). The ECU 5 performs various controls for operating the wiper 4 in accordance with a signal input from the wiper switch 51.

The operation of the wiper device 1 configured as above will now be described.

In a state in which the wiper blade 12 is arranged at the stop position P1, when the wiper switch 51 is activated to eject the washer fluid, the wiper switch 51 outputs an ejection instruction signal to instruct the ECU 5 to eject the washer fluid. When the ejection instruction signal is input, the ECU 5 immediately drives the pump 23 to eject the washer fluid from the ejection port 21d (see FIG. 3A) of the washer nozzle 21. As shown in FIG. 2, the washer fluid is ejected in the direction extending toward the distal end of the wiper blade 12 at the front of the wiper blade 12 in the moving direction when the wiper blade 12 starts wiping from the stop position P1. The washer fluid falls at the falling point X at the basal side of the longitudinally middle part of the wiper blade 12 at the front of the wiper blade 12 in the moving direction when the wiper blade 12 starts wiping from the stop position P1.

When the ejection instruction signal is input, the ECU 5 immediately drives a timer circuit to measure the time from when the ejection instruction signal is input. After a predetermined waiting time elapses, the ECU 5 drives the wiper driver 3 to pivot the wiper 4 a predetermined number of times and swing the wiper blade 12 between the stop position P1 and the upper reversal position P2. The waiting time is set in advance in accordance with the time the washer fluid ejected from the washer nozzle 21 spreads from the distal end to the basal end of the wiper blade 12 at the front of the wiper blade 12 in the moving direction when wiping starts. Thus, as shown by section (a) in FIG. 4, the wiper blade 12 moves toward the upper reversal position P2 in a state in which the washer fluid W is widely spread from the distal end to the basal end when wiping starts. This wipes the wiping surface 2a in a satisfactory manner. As shown by section (b) in FIG. 4, the washer fluid W moves downward due to gravitational force when the wiper blade 12 is arranged at the upper reversal position P2. Then, as shown by section (c) in FIG. 4, the wiper blade 12 moves from the upper reversal position P2 to the stop position P1 as the wiper arm 11 pivots. In FIG. 4, the wiper arm 11 including the main arm 13 and the sub-arm 14 is illustrated in a simplified manner.

As shown in FIG. 5, the hose 22 bends as the main head 15 pivots about the pivot shaft 7 when the wiper 4 is pivoted back and forth.

The present embodiment has the advantages as described above.

(1) The wiper arm 11, which including two arms, namely, the main arm 13 and the sub-arm 14, is arranged at the rear of the wiper blade 12 in the moving direction when the wiper blade 12 starts wiping. This prevents the driver's field of view from being obstructed by the wiper arm 11 at the stop position. That is, the wiper blade 12 moves in a first direction from the home position P1 to the upper reversal position P2 and in a second direction from the upper reversal position P2 to the home position P1. Further, the wiper arm 11 is arranged at a position in the second direction side with respect to the wiper blade 12 when the wiper blade 12 is arranged at the home position P1. In the wiper device 1, the main arm 13, which is closer to the wiper blade 12 than the sub-arm 14 includes the washer nozzle 21, which is fixed at a position near the basal side of the main arm 13 that is farther from the wiper blade 12. Further, the ejection direction D of the washer fluid from the washer nozzle 21 is set extending toward the distal end of the wiper blade 12 at the front of the wiper blade 12 in the moving direction when the wiper blade 12 starts wiping from the stop position P1. In other words, in a state in which the wiper blade 12 is arranged at the home position P1, the ejection direction D of the washer fluid is set extending toward the distal end of the wiper blade 12, which is located at a position in the first direction with respect to the wiper blade 12. Thus, the washer fluid ejected from the washer nozzle 21 strikes the wiping surface 2a at an acute angle when falling on the wiping surface 2a, and the washer fluid that falls on the wiping surface 2a spreads out in an elongated manner along the longitudinal direction of the wiper blade 12 at the front of the wiper blade 12 in the moving direction when wiping starts. Further, the falling point X of the washer fluid is set to a position located toward the basal side from the longitudinally central part of the wiper blade 12. Thus, by adjusting the ejection amount and ejection pressure of the washer fluid, the washer fluid can be spread out further widely in the longitudinal direction of the wiper blade 12. When the wiper blade 12 performs wiping in this state, the wiper blade 12 spreads out the washer fluid in the moving direction of the wiper blade 12. The wiper blade 12 also cleans the wiping surface 2a with the washer fluid. This improves the wiping performance of the wiper device 1. As a result, the wiper device 1 provides the driver of the vehicle with a satisfactory field of view.

The washer nozzle 21 is fixed at a position nearer the basal side of the wiper blade 12 on the main arm 13. This significantly shortens the hose 22 that supplies the washer fluid to the washer nozzle 21. Accordingly, costs are reduced, and the layout (coupling) of the hose 22 is facilitated.

Moreover, the washer nozzle 21 is fixed to the main arm 13 at a position that is not parallel to the wiper blade 12 in the wiping direction. Accordingly, even though the washer nozzle 21 is not greatly projected and does not transverse the upper side of the wiper blade 12, the ejected washer fluid falls toward the front of the wiper blade 12 in the moving direction when wiping starts without being interfered by the wiper blade 12. Since the washer nozzle 21 is not greatly projected and does not transverse the upper side of the wiper blade 12, the washer nozzle 21 does not receive wind resistance and does not produce wind noise when the vehicle travels. Further, the appearance of the wiper 4 is not adversely affected.

(2) The washer nozzle 21 is fixed to the main head 15, which is coupled to the pivot shaft 7. Thus, the washer fluid is ejected towards the wiping surface 2a even when the main arm member 16 is pivoted to move away from the wiping surface 2a so that the wiper blade 12 is separated from the wiping surface 2a and takes an upright position. When the washer nozzle 21 is fixed to the main arm member 16 and the wiper 4 takes the upright position, the washer fluid may be erroneously ejected into air. However, by fixing the washer nozzle 21 to the main head 15, the washer fluid is prevented from being erroneously into air. The main head 15 is arranged toward the basal side of the main arm 13 from the main arm member 16. This shortens the hose 22. As a result, costs are further reduced, and the layout (coupling) of the hose 22 is further facilitated.

(3) When the longitudinal axis L3 of the wiper blade 12 at the stop position P1 is horizontal or ascends from the distal end towards the basal end, the ejected washer fluid may become farther from the wiper blade towards the distal side of the wiper blade 12. In the wiper device 1 of the present embodiment, the longitudinal axis L3 of the wiper blade 12 at the stop position P1 descends from the distal end toward the basal end. This prevents the ejected washer fluid from separating from the wiper blade 12 towards the distal side of the wiper blade 12. Further, the ejection axis of the ejected washer fluid is easily set substantially parallel to the longitudinal axis L3 of the wiper blade 12 at the front of the wiper blade 12 in the moving direction when the wiper blade 12 starts wiping without increasing the amount the washer nozzle 21 is projected from the main arm 13.

(4) The ejection direction D of the washer fluid is set in a direction extending toward the longitudinally distal end of the wiper blade 12 at the front of the wiper blade 12 in the moving direction when the wiper blade 12 starts wiping at the stop position P1. Thus, when the washer fluid is ejected in a state in which the wiper blade 12 is arranged at the stop position P1, the washer fluid that falls at the falling point X is spreads out in an elongated manner toward the distal side of the wiper blade 12 from the falling point X due to its inertia. Further, the longitudinal axis L3 of the wiper blade 12 arranged at the stop position P1 descends relative to the vertical direction from the distal portion toward the basal portion. Thus, during the period from when the washer fluid is ejected in response to the ejection instruction signal until when the waiting time elapses, some of the washer fluid moves along the wiper blade 12 toward the basal side of the wiper blade 12. In this case, since the front glass 2 is normally inclined relative to the vertical direction, the wiper blade 12 and the wiping surface 2a of the front glass 2 cooperate to guide the washer fluid toward the basal side of the wiper blade 12. Accordingly, the washer fluid reaches the basal side of the wiper blade 12 from the falling point X.

(5) Even when the washer fluid does not reach the basal end of the wiper blade 12 from the falling point X during the waiting time, the washer fluid is spread out from the distal end to the basal end of the wiper blade 12 as the washer fluid W that moves together with the wiper blade 12 falls down at the upper reversal position P2, as shown in FIG. 4B. As a result, when the wiper blade 12 is moved from the upper reversal position P2 toward the stop position P1, wiping is performed in a state in which the washer fluid is spread from the distal end to the basal end of the wiper blade 12.

(6) The wiping position of the wiper blade 12 relative to the wiper arm 11 changes. Thus, the falling point X, which is set toward the front in the moving direction of the wiper blade 12 when wiping starts at the stop position P1, switches to the side that becomes the front in the moving direction after the wiper blade 12 is reversed at the upper reversal position P2 (see FIG. 1). That is, the falling point X is switched from a position in the first direction to a position in the second direction with respect to the wiper blade 12. Thus, even when the driver operates the wiper switch 51 when the wiper 4 is pivoting to re-eject the washer fluid, the wiper blade 12 wipes the washer fluid as it moves in the reverse direction. Thus, the washer fluid is effectively used. Furthermore, the washer fluid that falls on the wiping surface 2a tends to spread out in the direction of the ejection axis D. Thus, in the vicinity of the upper reversal position P2, the washer fluid may be sprayed out of the wiping surface 2a (outward from the front pillar). However, in the vicinity of the upper reversal position P2, the wiper blade 12 is pivoted relative to the wiper arm 11, to which the washer nozzle 21 is fixed, to change the wiping position so that the ejection axis D intersects the longitudinal axis L3 of the wiper blade 12 when viewed from the normal direction of the wiping surface 2a. Accordingly, the wiper blade 12, which changes wiping positions, is located at the front of the direction of the ejection axis D direction of the washer fluid. This effectively prevents the washer fluid from being sprayed out.

(7) The washer nozzle 21 is fixed to the side surface of the main head 15 and does not project upward from the main arm 13. Thus, interference between the washer nozzle 21 and the sub-arm 14 is prevented while keeping the height low from the wiping surface 2a of the wiper arm 11 (main arm 13). This increases the degree of layout freedom for the side surface 15d on the main head 15 of the washer nozzle 21.

It should be apparent to those skilled in the art that the present invention may be embodied in many other specific forms without departing from the spirit or scope of the invention. Particularly, it should be understood that the present invention may be embodied in the following forms.

In the embodiment described above, the ECU 5 turns the wiper 4 after the waiting time elapse from when the ejection instruction signal is input from the wiper switch 51. However, the ECU 5 may turn the wiper 4 before the waiting time elapses (e.g., at the same time when washer fluid is ejected from the washer nozzle 21). This also obtains advantage (1) of the embodiment described above.

Figure 6:
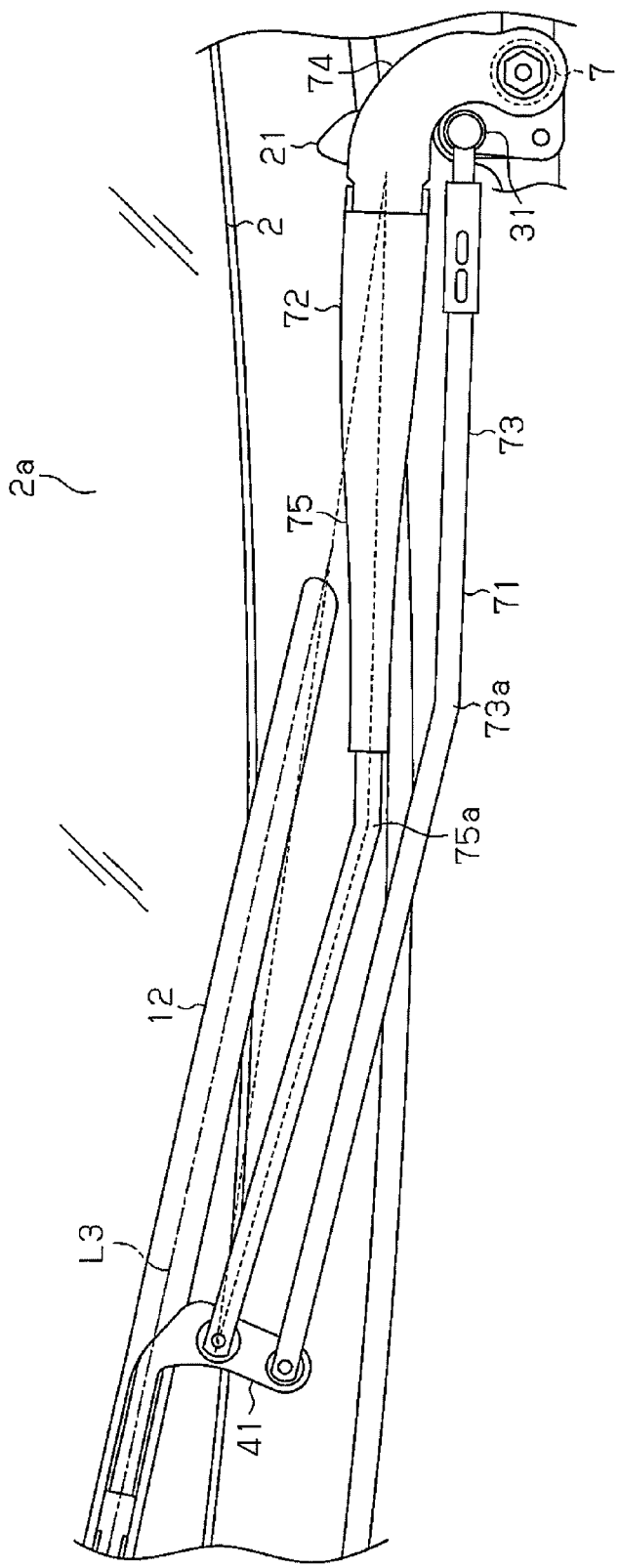
FIG. 6 is a schematic diagram of a wiper device according to a further embodiment of the present invention.

The shape of the wiper arm 11 is not limited to that of the embodiment described above. A wiper arm 71 shown in FIG. 6 may be arranged in the wiper device 1 in place of the wiper arm 11 of the embodiment described above. The wiper arm 71 includes a main arm 72 and a sub-arm 73. The main arm 72 includes a basal portion coupled to and rotated integrally with the pivot shaft 7. The sub-arm 73 includes a basal portion pivotally coupled to the driven shaft 31. The main arm 72 is rod-shaped and includes a main head 74 and a main arm member 75. The main head 74 includes a basal portion coupled to and rotated integrally with the pivot shaft 7. The main arm member 75 includes a basal portion coupled to the distal portion of the main head 74. The washer nozzle 21 is fixed to the main head 74, which is arranged at the basal portion of the main arm 72. The ejection direction and the falling point of the washer fluid from the washer nozzle 21 are set in the same manner as the embodiment described above. The main arm member 75 is coupled to the distal portion of the main head 74 so as to be pivotal toward and away from the wiping surface 2a. Further, the main arm member 75 includes a bent portion 75a, which is bent so that the distal portion of the main arm member 75 extends toward the wiper blade 12 (toward the front in the moving direction when wiping starts). In the same manner as the main arm member 75, the rod-shaped sub-arm 73 includes a bent portion 73a, which is bent so that the distal portion of the sub-arm extends toward the wiper blade 12 (toward the front in the moving direction when wiping starts). The main arm 72 is arranged closer to the wiper blade 12 than the sub-arm 73. The distal portion of the main arm 72 and the distal portion of the sub-arm 73 are pivotally coupled to the coupling member 41, which is coupled to the wiper blade 12 in the same manner as the embodiment described above. In a state in which the wiper blade 12 is arranged at the stop position, the basal portion of the wiper blade 12 is arranged in a triangular region (triangular region surrounded by a broken line in FIG. 6) of which vertices are the basal portion, distal portion, and bent portion 75a of the main arm 72.

In this case, in a state in which the wiper blade 12 is arranged at the stop position (i.e., state shown in FIG. 6), the wiper blade 12 is arranged so that its longitudinal axis L3 descends from the distal end toward the basal end without the need to arrange the basal portion of the wiper blade 12 between the wiper arm 71 and the wiping surface 2a, that is, without the need for overlapping the basal portion of the wiper blade 12 and the wiper arm 71 (main arm 72) in the normal direction of the wiping surface 2a. This allows for the height of the main arm 72 from the wiping surface 2a to be kept low. Thus, when a vehicle includes the wiper device 1, in addition to keeping the wind resistance received by the main arm 72 low, the main arm 72 is prevented from obstructing the driver's field of view. Generally, when the main arm is located at a high position, the main arm may enter the driver's field of view from the passenger compartment. However, the wiper arm 71 shown in FIG. 6 prevents the main arm from entering the driver's field of view from the passenger compartment.

In the embodiment described above, the wiper blade 12 is coupled to the distal portion of the wiper arm 11 so that the longitudinal axis L3 extends along a descending slope from the distal end toward the basal end of the wiper blade 12 when arranged at the stop position P1. However, the wiper blade 12 may be coupled to the distal portion of the wiper arm 11 so that the longitudinal axis L3 is horizontal when arranged at the stop position P1. Further, the wiper blade 12 may be coupled to the distal portion of the wiper arm 11 so that the longitudinal axis L3 extends along an ascending slope from the distal end toward the basal end of the wiper blade 12 when arranged at the stop position P1.

The shape of the seat 15g is not limited to that of the embodiment described above. The seat 15g may be shaped so that it projects from the side surface 15d and the washer nozzle 21 is inserted from the distal side of the main head 15.

The position at which the washer nozzle 21 is fixed to the main arm 13 is not limited to that of the embodiment described above. The washer nozzle 21 may be fixed at a position nearer the basal side of the main arm 13 from the wiper blade 12. For instance, the washer nozzle 21 may be fixed to the main head 15 at the head main body 15b (i.e., between side surfaces 15c, 15d). In other words, the fastening surface 15h, to which the washer nozzle 21 is fixed, does not have to be parallel with the axis L2 of the shaft coupling portion 15a and may be inclined. Further, the washer nozzle 21 may be fixed to the main arm member 16. In this case, the washer nozzle 21 may be fixed to the side surface of the main arm retainer 16a. Alternatively, the washer nozzle 21 may be fixed inside the main arm retainer 16a. Further, the washer nozzle 21 may be fixed to the main arm piece 16b. The washer nozzle 21 may be integrally molded with the head cover 15k. This also obtains advantage (1) of the embodiment described above.

In the embodiment described above, the main arm 13 is arranged closer to the wiper blade 12 than the sub-arm 14. However, the sub-arm 14 may be arranged closer to the wiper blade 12 than the main arm 13. In this case, the washer nozzle 21 is fixed at a position nearer a basal side of the sub-arm 14 from the wiper blade 12. Further, in a state in which the wiper blade 12 is arranged at the stop position P1, the ejection direction D of the washer fluid is set in a direction extending toward the distal end of the wiper blade 12 at the front side of the wiper blade 12 in the moving direction when wiping starts. The falling point X of the washer fluid is set toward the basal side of the wiper blade 12 from the longitudinally central part of the wiper blade 12. This also obtains advantage (1) of the embodiment described above.

In the embodiment described above, the wiper 4 may have the wiper blade 12 take the upright position separated from the wiping surface 2a. However, the wiper 4 does not have to be configured so that the wiper blade 12 takes the upright position.

In the embodiment described above, it is required that at least one falling location (falling point X) for the washer fluid is provided in the basal side of the wiper blade 12. Accordingly, for example, in the elongated wiper blade 12, a washer nozzle (preferably, a single washer nozzle) may include a plurality of ejection ports so that the washer fluid ejected from the basal side of the wiper arm 11 falls not only toward the basal side of the longitudinally central part of the wiper blade 12 but also toward the distal side. This also spreads out the washer fluid that falls on the wiping surface 2a in an elongated manner along the longitudinal direction of the wiper blade 12. Thus, the washer fluid is spread out in the longitudinal direction of the wiper blade 12 while reducing the number of ejection ports.

In the above-described embodiment, the wiper device 1 is used to wipe the wiping surface 2a of the front glass 2 of the vehicle. However, the wiper device 1 may be used to wipe the wiping surface, which is arranged at the outer side of the vehicle compartment, of a rear glass arranged at the rear of the vehicle. The wiper device 1 may be used in a vehicle such as a train.

A technical concept that can be acknowledged from the embodiment and modified examples described above will not be described.

(A) The wiper device according to any one of claims 1 to 5, wherein the wiping surface is a surface of a front glass of a vehicle located at an outer side of a passenger compartment. This structure improves the wiping performance of the wiper device and provides the driver of the vehicle with a satisfactory field of view.

The invention claimed is:

1. A wiper device comprising:
    a wiper arm including a main arm and a sub-arm;
        the main arm including a main head and a main arm member, the main head being arranged at a basal portion of the main arm and being coupled to and pivoting integrally with a drive shaft, the main arm member being coupled to a distal portion of the main head and pivoting toward and away from a wiping surface;
        the sub-arm including a basal portion pivotally coupled to a driven shaft, the driven shaft being separated from the drive shaft, and the driven shaft rotating in cooperation with and following the pivoting of the main arm;
    a wiper blade pivotally coupled to a distal portion of the wiper arm with the main arm being arranged closer to the wiper blade than the sub-arm;
        the wiper blade changing a wiping position for wiping the wiping surface between a first wiping direction and a second wiping direction;
        the wiper blade moving in the first wiping direction from a home position to an upper reversal position and moving in the second wiping direction from the upper reversal position to the home position;
        the wiper blade being interconnected to the main arm and the sub-arm and rotating relative to the pivoting of the main arm, and the wiper blade changing positions relative to the main arm and the sub-arm in cooperation with the pivoting of the main arm;
        the wiper blade is in the home position while the main arm and the sub-arm are arranged at corresponding positions in the second direction with respect to the wiper blade;
    a washer nozzle fixed to the main head of the main arm;
        the washer nozzle being located at a position nearer a basal side of the wiper arm relative to the wiper blade; and
        the washer nozzle ejecting washer fluid toward the wiping surface and in an ejection direction toward a distal end of the wiper blade in the first direction with respect to the wiper blade when the wiper blade is arranged at the home position,
    wherein a falling point of the washer fluid is set at a position located toward the basal side of the wiper blade from a longitudinally central part of the wiper blade, and
    wherein a hose is connected with the washer nozzle and the hose bends as the main head pivots.

2. The wiper device according to claim 1, wherein the wiper blade changes the wiping position relative to the wiper arm when moving in the first direction so that the falling point is switched from a position in the first direction to a position in the second direction with respect to the wiper blade, and a longitudinal axis of the wiper blade intersects an ejection axis of the washer fluid when viewed from a normal direction of the wiping surface in a state in which the wiper blade is arranged near the upper reversal position.

3. The wiper device according to claim 1, wherein the wiper blade is coupled to the distal portion of the wiper arm so that a longitudinal axis of the wiper blade descends from the distal end toward basal end of the wiper blade when arranged at the home position.

4. The wiper device according to claim 3, wherein
    the main arm includes a bent portion, which bends a distal portion located opposite to the basal portion toward the wiper blade, and
    the basal portion of the wiper blade is arranged in a triangular region, of which vertices are the basal portion, distal portion, and bent portion of the main arm when the wiper blade is arranged at the home position.

5. The wiper device according to claim 3, further comprising:
    a drive means for directly or indirectly driving the drive shaft; and
    a control means for controlling the ejection of the washer fluid from the washer nozzle and the driving of the drive means based on an ejection instruction signal input by activating a washer switch;
    wherein the control means immediately ejects the washer fluid from the washer nozzle when the ejection instruction signal is input, and the control means further controls the drive means to drive the drive shaft after a predetermined waiting time elapses from when the ejection instruction signal is input.

6. The wiper device according to claim 1, wherein the main head includes a first side surface, facing toward the sub-arm, and a second side surface, opposite from the first side surface, and the washer nozzle is fixed to the second side surface.

* * * * *